United States Patent
Hollis et al.

(10) Patent No.: US 7,231,262 B2
(45) Date of Patent: Jun. 12, 2007

(54) APPARATUS FOR MONITORING AND CONTROLLING USE OF EQUIPMENT

(75) Inventors: Dean Hollis, Colonia Roma (MX); Kevin C. Lestourgeon, San Antonio, TX (US)

(73) Assignee: Enterprise Management Services, L.L.C., San Antonio, TX (US)

(*) Notice: Subject to any disclaimer, the term of this patent is extended or adjusted under 35 U.S.C. 154(b) by 92 days.

(21) Appl. No.: 10/903,962

(22) Filed: Jul. 30, 2004

(65) Prior Publication Data

US 2006/0025870 A1    Feb. 2, 2006

(51) Int. Cl.
- G05B 11/01 (2006.01)
- G04F 8/00 (2006.01)
- G04F 10/00 (2006.01)
- H01H 7/00 (2006.01)
- G04B 47/00 (2006.01)
- H01H 43/00 (2006.01)

(52) U.S. Cl. .............................. 700/14; 700/83; 368/9; 368/10; 307/141; 307/141.4

(58) Field of Classification Search ................. 700/14, 700/83; 368/9, 10; 307/141, 141.4
See application file for complete search history.

(56) References Cited

U.S. PATENT DOCUMENTS

| | | | |
|---|---|---|---|
| 3,879,332 A * | 4/1975 | Leone ....................... 200/33 R |
| 4,279,012 A * | 7/1981 | Beckedorff et al. ........... 700/16 |
| 4,318,181 A * | 3/1982 | Kawakami et al. ......... 702/176 |
| 4,484,220 A * | 11/1984 | Beetner ...................... 348/730 |
| 4,588,901 A * | 5/1986 | Maclay et al. .............. 307/141 |
| 4,624,578 A * | 11/1986 | Green .......................... 368/10 |
| 4,956,825 A * | 9/1990 | Wilts et al. .................... 368/9 |
| 5,125,492 A * | 6/1992 | Treleaven et al. .......... 194/241 |
| 5,191,231 A * | 3/1993 | Berry .......................... 307/142 |
| 5,258,656 A * | 11/1993 | Pawlick ...................... 307/141 |
| 5,283,475 A * | 2/1994 | Berger ..................... 307/141.4 |
| 5,917,256 A * | 6/1999 | Broadbent, II .............. 307/141 |
| 6,377,858 B1 * | 4/2002 | Koeppe ........................ 700/12 |
| 6,388,952 B2 * | 5/2002 | Kim ............................. 368/74 |
| 6,442,106 B1 * | 8/2002 | Newby et al. ................. 368/4 |
| 6,519,208 B2 * | 2/2003 | DeVries ....................... 368/10 |
| 6,903,284 B2 * | 6/2005 | Dunfield et al. .......... 200/51 R |
| 2002/0075760 A1 * | 6/2002 | DeVries ....................... 368/10 |

* cited by examiner

*Primary Examiner*—Anthony Knight
*Assistant Examiner*—Sunray Chang
(74) *Attorney, Agent, or Firm*—Tod R. Nissle, P.C.

(57) ABSTRACT

Apparatus is provided for controlling and limiting the amount of time that a television, computer game, or other electrical appliance can be utilized. The apparatus is inserted in the electrical cord leading to the electrical appliance and is programmable to limit the amount of time that electricity flows through the electrical cord tot he electrical appliance. The plug end of the electrical cord of the appliance is locked into the apparatus to prevent the electrical appliance from being unplugged from the apparatus and plugged into an electrical wall outlet.

2 Claims, 8 Drawing Sheets

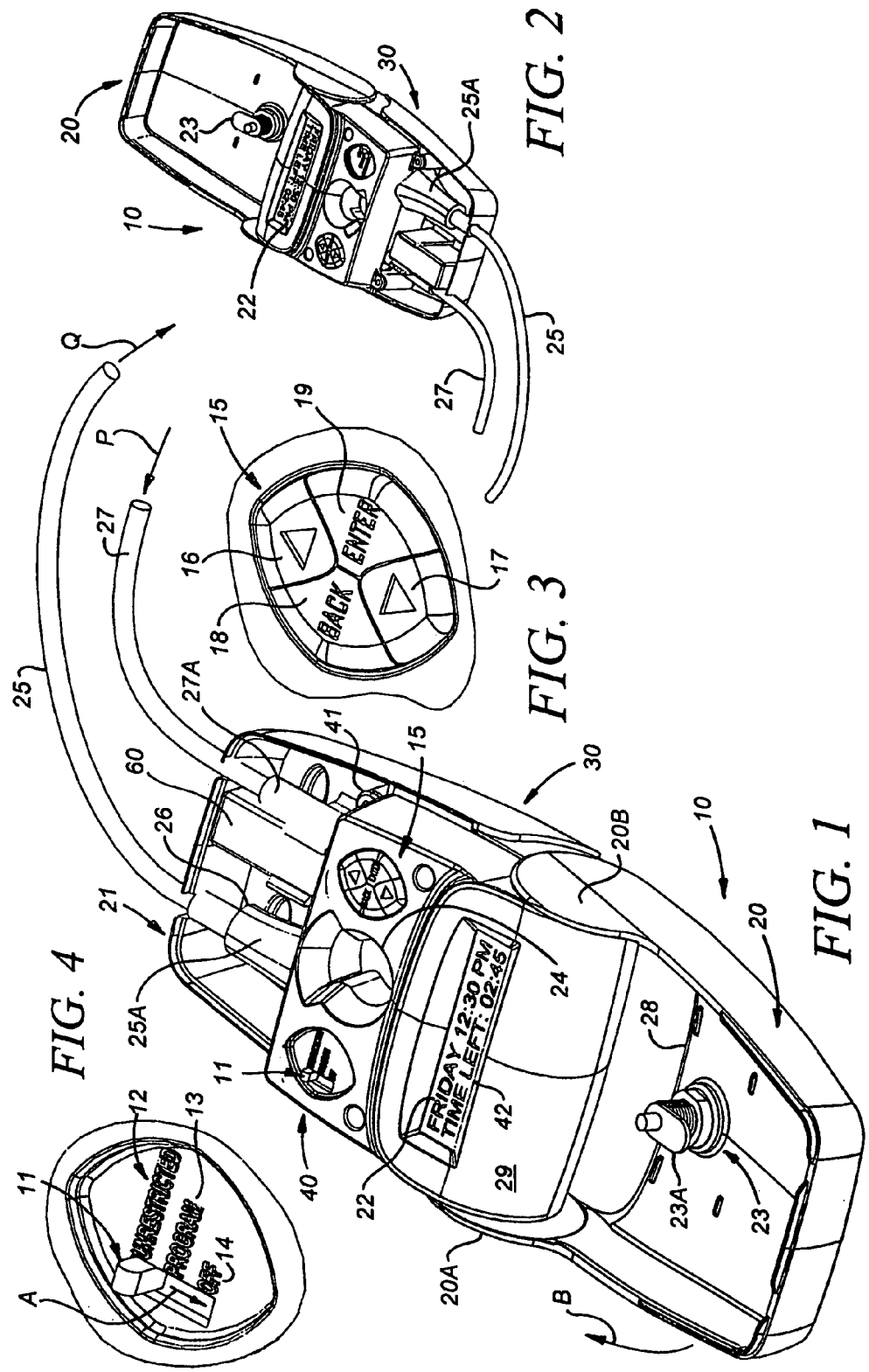

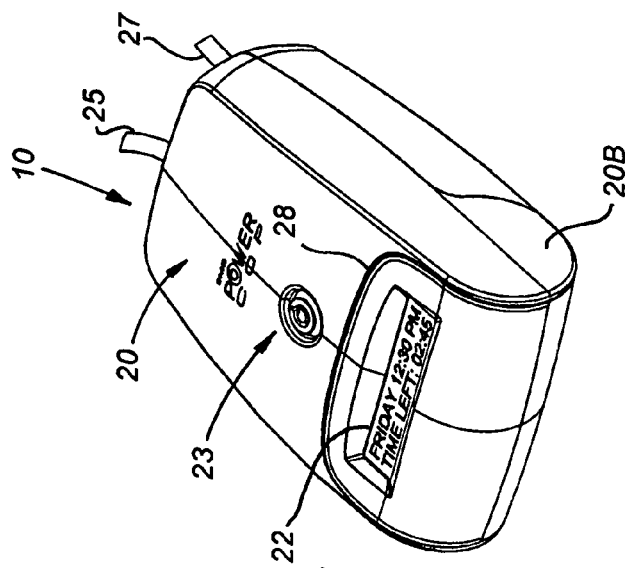
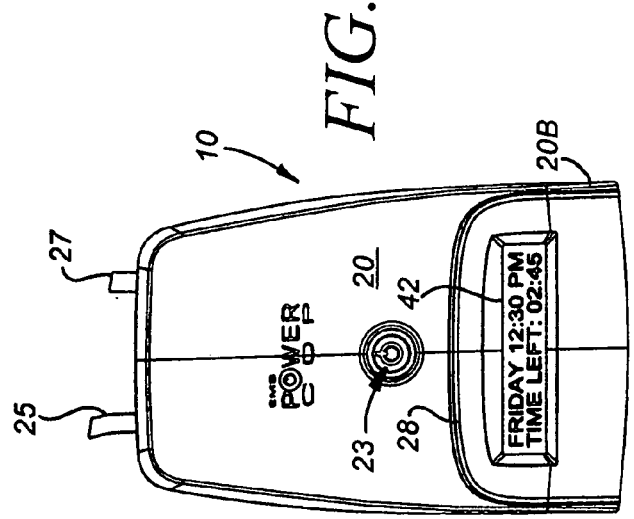
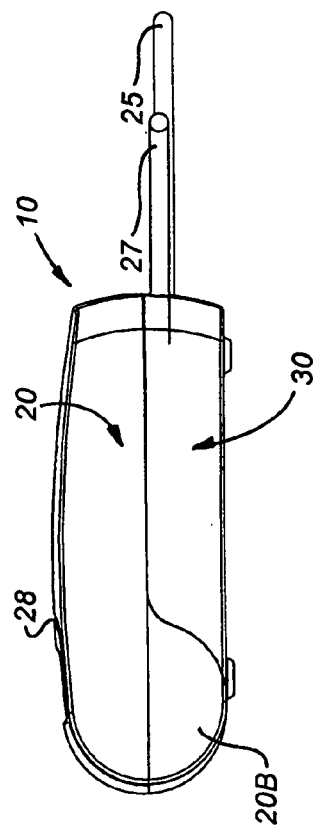
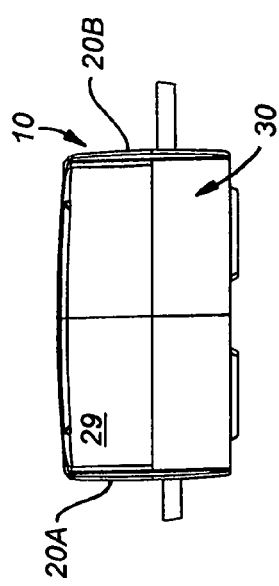
FIG. 5
FIG. 6
FIG. 7
FIG. 8

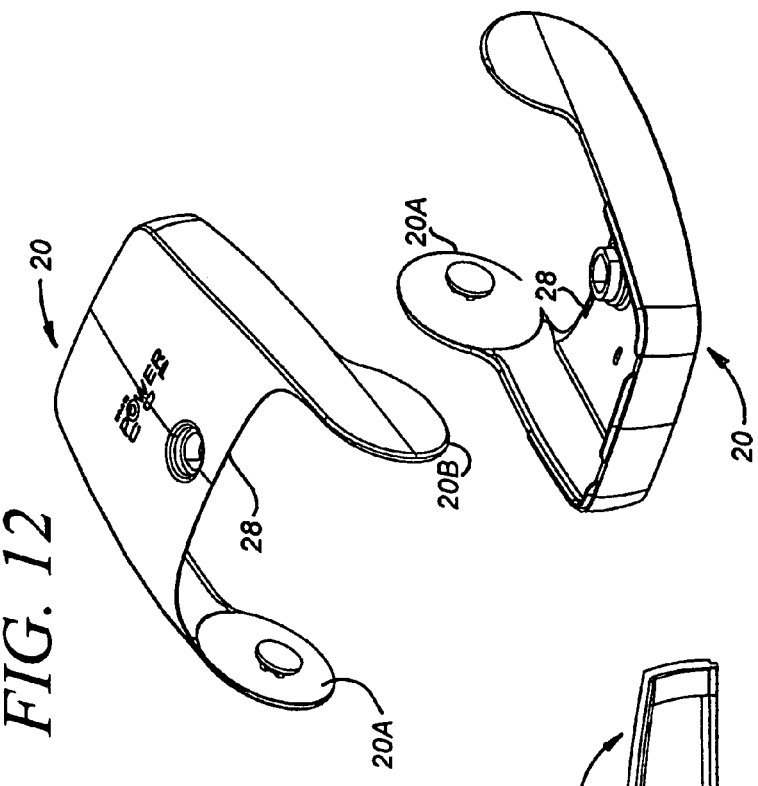
FIG. 12
FIG. 13
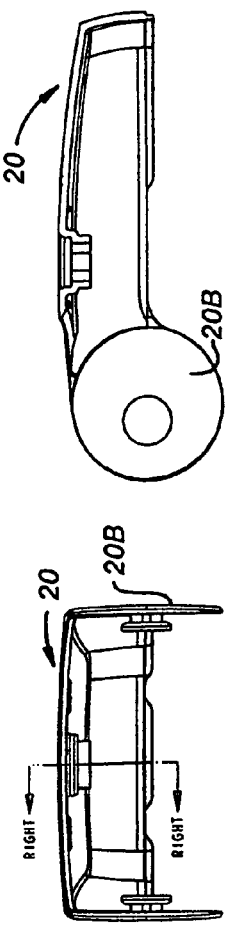
FIG. 11
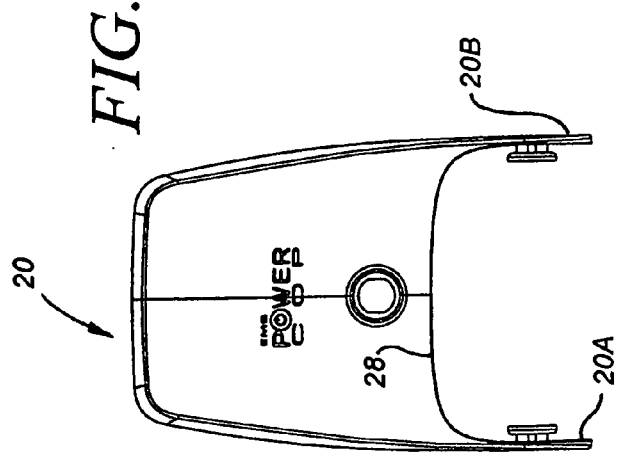
FIG. 9
FIG. 10

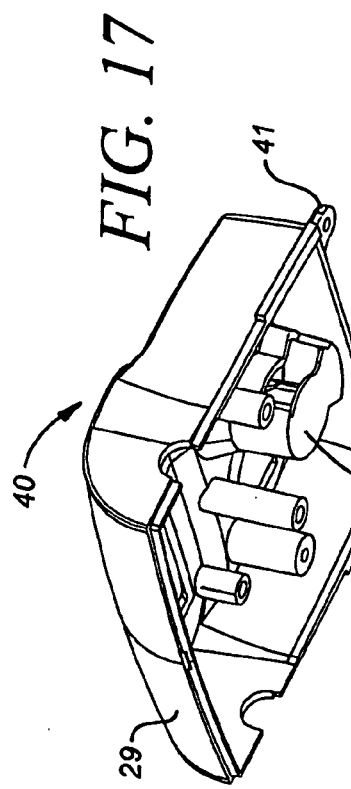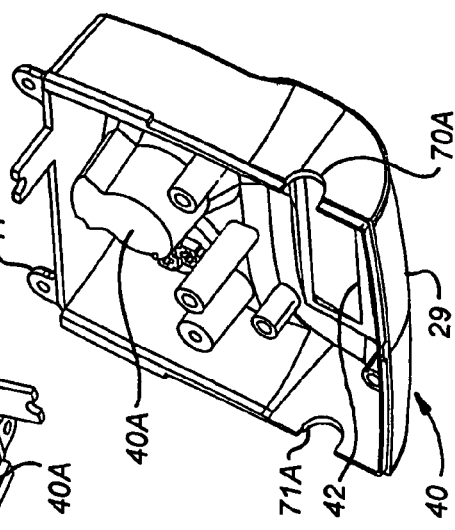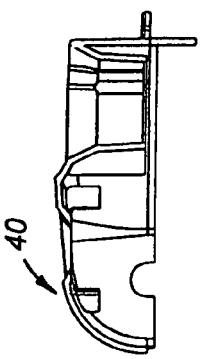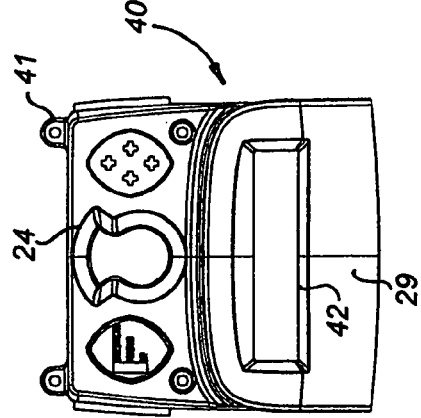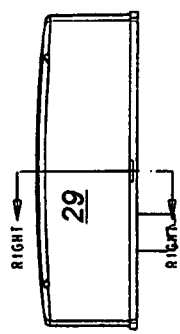

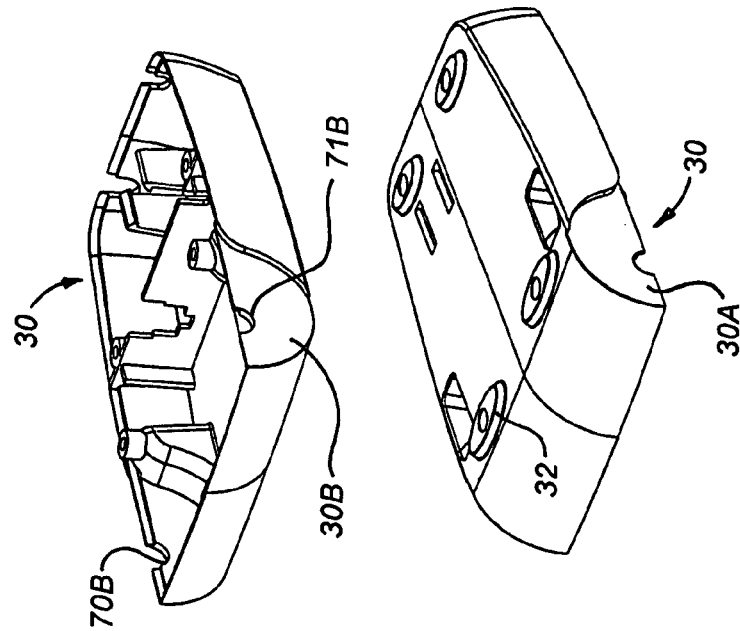
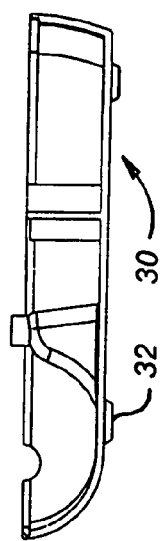
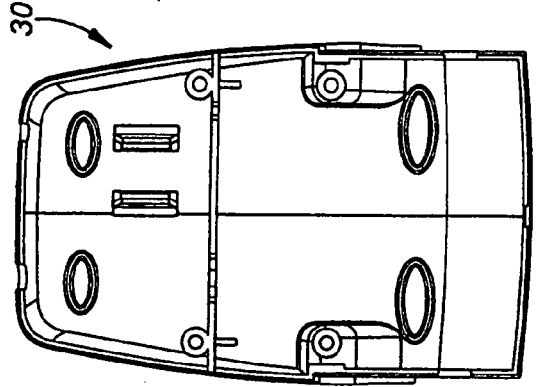
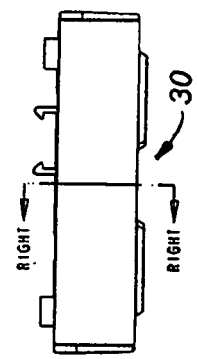
FIG. 23　FIG. 24
FIG. 22
FIG. 20
FIG. 21

APPARATUS FOR MONITORING AND CONTROLLING USE OF EQUIPMENT

This invention pertains to an apparatus and method for monitoring and controlling the use of equipment.

More particularly, the invention pertains to an apparatus and method for limiting the time that an electrical appliance can be utilized.

In a further respect, the invention pertains to an apparatus and method that incorporates and utilizes a portion of the conventional electrical cord of an appliance to limit the time that the appliance can be utilized.

In another respect, the invention pertains to an apparatus and method for monitoring with a restricted access control unit in a residence the use of an electrical appliance.

In still a further respect, the invention pertains to an apparatus and method to limit the use of entertainment electrical appliances like televisions, computers, and video game units like PLAYSTATION™ and X-BOX™.

It often is beneficial to limit the use of electrical appliances. In particular, it is desirable to limit the amount of time that children spend watching television and playing games on computers and video game units. While some use of television and other entertainment electrical appliances is reasonable, in many cases children spend an undue proportion of their time utilizing such appliances, to the detriment of the development of normal social, verbal, and other intellectual and physical skills.

Accordingly, it would be highly desirable to provide an improved method and apparatus for monitoring and controlling the use of electrical appliances, especially entertainment electrical appliances.

Therefore, it is a principal object of the invention to provide an improved method and apparatus for monitoring and controlling the use of electrical appliances.

Another object of the invention is to provide apparatus that permits a parent to readily restrict the amount of time a child utilizes an entertainment electrical appliance.

These and other, further and more specific objects and advantages of the invention will be apparent from the following detailed description of the invention, taken in conjunction with the drawings, in which:

FIG. 1 is a perspective view illustrating an electrical monitoring apparatus in an open configuration and constructed in accordance with the principles of the invention;

FIG. 2 is a perspective view further illustrating the electrical monitoring apparatus of FIG. 1 in an open configuration;

FIG. 3 is a perspective view illustrating a programming/control button utilized in the electrical monitoring apparatus of FIG. 1;

FIG. 4 is a perspective view illustrating another programming/control button utilized in the electrical monitoring apparatus of FIG. 1:

FIG. 5 is a top view of the electrical monitoring apparatus of FIG. 1 in a closed configuration;

FIG. 6 is a perspective view illustrating the electrical monitoring apparatus of FIG. 5;

FIG. 7 is a front view illustrating the electrical monitoring apparatus of FIG. 5;

FIG. 8 is a side view illustrating the electrical monitoring apparatus of FIG. 5;

FIG. 9 is a top view illustrating a cover utilized in the electrical monitoring apparatus of FIG. 1;

FIG. 10 is a front view illustrating the cover of FIG. 9;

FIG. 11 is a side view illustrating the cover of FIG. 9;

FIG. 12 is a top perspective view illustrating the cover of FIG. 9;

FIG. 13 is a bottom perspective view illustrating the cover of FIG. 9;

FIG. 14 is a top view illustrating a housing member of the electrical monitoring apparatus of FIG. 1;

FIG. 15 is a front elevation view illustrating the housing member of FIG. 14;

FIG. 16 is a bottom view illustrating the housing member of FIG. 14;

FIG. 17 is a bottom perspective view illustrating the housing member of FIG. 14;

FIG. 18 is a side section view of the housing member of FIG. 15;

FIG. 19 is a top perspective view illustrating the housing member of FIG. 14;

FIG. 20 is a top view illustrating the base of the electrical monitoring apparatus of FIG. 1;

FIG. 21 is a front elevation view illustrating the base of FIG. 20;

FIG. 22 is a side section view illustrating the base of FIG. 21;

FIG. 23 is a top perspective view illustrating the base of FIG. 20;

FIG. 24 is a bottom perspective view illustrating the base of FIG. 20;

Figure 25:
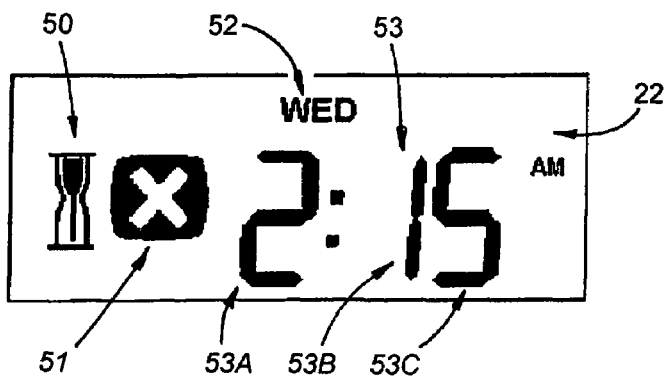
FIG. 25 is a top view illustrating one mode of operation of the display of the electrical monitoring apparatus of FIG. 1.

Briefly, in accordance with our invention, we provide an improved method for controlling the use of an entertainment electrical appliance selected from a group consisting of a television, a computer, and a video game. The electrical appliance includes an electric outlet cord to provide electricity to the electrical appliance. The outlet cord includes a distal end having a plurality of prongs shaped and dimensioned to be inserted in an electrical outlet. The improved method includes the step of providing a control unit. The control unit includes a housing; and, an electrical transfer unit mounted in the housing. The electric transfer unit includes a transfer unit outlet shaped to receive the prongs on the outlet cord and to provide electricity to the outlet cord; a power cord having a distal end shaped and dimensioned to be inserted in the electrical outlet; a switch to control the flow of electricity to the outlet cord when the prongs are inserted in the transfer unit outlet; and, a lock to secure the prongs in the transfer unit outlet. The method also includes the steps of inserting the prongs in the transfer unit outlet; operating the switch to control the flow of electricity to the outlet cord; utilizing the lock to secure the prongs in the transfer unit outlet; and, inserting the distal end of the power cord in the electrical outlet.

In another embodiment of the invention, we provide improvements in combination with an electrical appliance. The appliance includes an electrical outlet cord. The cord includes a distal end having a prong configuration shaped and dimensioned to be inserted in an electrical wall outlet. The improvements comprise apparatus to monitor use of the electrical appliance. The apparatus includes a housing; and, an electrical transfer unit mounted in the housing. The electrical transfer unit includes a transfer unit outlet receiving the prongs on the outlet cord to provide electricity to the outlet cord; a power cord having a distal end inserted in the electrical outlet to deliver electricity to the transfer unit; a switch limiting the flow of electricity from the transfer unit to the outlet cord to a selected time period; and, a display indicating the proportion of the selected time period remaining.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 to 24, 31, 32 illustrate an electrical monitoring-control apparatus constructed in accordance with the invention and generally indicated by reference character 10. Control apparatus 10 includes base 30, housing 40, and cover 20. Housing 40 includes arcuate end 29 (FIG. 17) and at least one tab 41. Tab 41 includes an aperture formed therethrough to receive a screw used to fasten housing 40 to base 30.

Electrical cord 27 is connected at one proximate end 27A to housing 40 and at the other distal end to a plug (not shown) shaped to fit in a conventional electrical wall outlet. The proximate end 27A of cord or cable 27 is typically, although not necessarily, permanently connected to housing 40 and is considered part of apparatus 10.

Appliance electrical cord 25 is, in the practice of the invention, utilized in conjunction with apparatus 10, but is not considered part of apparatus 10 per se. Cord 25 is connected at one distal end (not shown) to a television, computer, PLAY STATION or other game set, or to another appliance. The distal end of cord or cable 25 is typically, although not necessarily, permanently connected to the television, computer, or other electrical appliance, and, cord 25 typically consists of the cord that originally came with the appliance. The other proximate end of cord 25 is provided with a conventional plug 25A that is shaped to fit in a conventional electrical wall outlet.

Housing 40 includes an electrical connector 40A with openings (not visible) shaped and dimensioned to receive the prongs on plug 25A or to receive the prongs (regardless whether there are two or three prongs) on the plug on any other electrical cord that is plugged into a conventional electrical wall outlet found in a residence or business. When the prongs of plug 25A are inserted in electrical connector 40A, plug 25A is in the position illustrated in FIGS. 1 and 2.

When apparatus 10 is installed, electricity flows from a wall outlet in a building through cord 27 in the direction of arrow P, into connector 40A, and (when permitted by microprocessor 60) out through plug 25A and cord 25 in the direction of arrow Q to a television, computer, or other appliance connected to the distal end of cord 25.

When switch 11 is moved to position shown in FIG. 4 adjacent the word "UNRESTRICTED" 12, the microprocessor 60 of apparatus 10 functions to permit electricity to continuously flow from cable 27 (assuming the distal end of cable 27 is plugged into a functioning electrical wall outlet), through connector 40A, and into cable 25. When switch 11 is moved in the direction of arrow A to a position adjacent the word "PROGRAM" 13, the microprocessor 60 of apparatus 10 permits electricity to flow from cable 27, through connector 40A, and through cord 25 to an appliance for a period of time that is programmed into microprocessor 60 (FIG. 1). The four segment button 15 is operated to program microprocessor 60 when switch 11 is in position adjacent the word "PROGRAM" 13. When switch 11 is moved in the direction of arrow A to a position next to the word "OFF" 14, the microprocessor 60 of apparatus 10 does not allow any electricity to flow from cable 27 through connector 40A, and into cable 25. Accordingly, microprocessor 60 opens or closes a switch in connector 40A to allow or prevent the flow of electricity from cable 27 through connector 40A to cable 25 depending on the position of switch 11 and depending on whether there is any remaining viewing time when switch 11 is moved to a position adjacent the word "PROGRAM" 13. The switch in connector 40A can be a mechanical switch or can be any other apparatus or system that can be controlled by microprocessor 60 or some other controller to stop or allow electricity to flow from cable 27 through connector 40A to cable 25.

Display screen 22 is connected to microprocessor 60. Microprocessor 60 is also connected to electrical connector 40A. Microprocessor 60 is operatively connected to and, as noted, controls a switch or other apparatus in connector 40A that permits electricity to flow through connector 40A or that prevents electricity from flowing through connector 40A from cord 27 to cord 25. Microprocessor 60 includes a clock to determine the time of day, and includes a calendar to identify the particular day (Monday, Tuesday, etc.) of the week, and, if desired, the calendar date.

Opening 42 in housing 40 circumscribes screen 22. Switch 11 in housing 40 is connected to microprocessor 60, as is the four quadrant button 15. Each of the four quadrants 16 to 19 can be depressed and released and is operable separately from the remaining quadrants 16 to 19. Aperture 24 in housing 40 is shaped and dimensioned such that when cover 20 is in the closed position illustrated in FIGS. 5 to 8, a key with a hollow round nose can be inserted in lock 23 and used to turn foot 23A ninety degrees from the unlocked position shown in FIG. 1 to a locking position in which foot 23A engages aperture 24 and prevents cover 20 from being moved from the closed position of FIGS. 5 to 8 to the open position of FIGS. 1 and 2. The key can also be used to turn foot 23A from the jocked to the unlocked position. When foot 23A is in the unlocked position, cover 20 can be opened.

FIGS. 9 to 13 illustrate cover 20, including edge 28 that extends intermediate wings 20A and 20B. Wing 20A pivotally engages aperture pair 70A–70B. Wing 20B pivotally engages aperture pair 71A–71B (FIGS. 19 and 23).

FIGS. 14 to 19 illustrate housing 40.

FIGS. 20 to 24 illustrate base 30. Base 30 includes feet 32 and semicircular inset surfaces 30A and 30B that receive and conform to wings 20A and 20B, respectively.

Various modes of operation are depicted on the display screens 22 illustrated in FIGS. 25 to 29.

In FIG. 25, microprocessor 60 causes the day of week 52 and the time of day 53 to appear on display screen 22. The day of the week 52 is shown as "WED". The time of day is shown as "2:15 AM". The microprocessor also causes the hourglass design 50 and "X" design 51 to appear on screen 22. The hourglass design 50 in FIG. 25 indicates that switch 11 is in position adjacent the word "PROGRAM" 13. The "X" design 51 in FIG. 25 indicates that there is no viewing time remaining for Wednesday. If no viewing time is remaining, microprocessor 60 controls electrical connector 40A to prevent connector 40A from transmitting electricity from cable 27 to cable 25. When electricity is not transmitted to cable 25, the television or other electrical appliance connected to the proximate end of cable 25 will not function.

Figure 26:
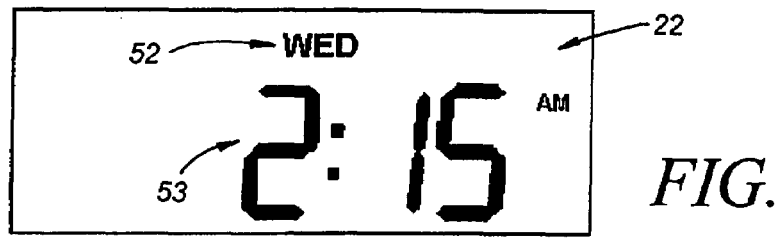
FIG. 26 is a top view illustrating the mode of operation of the display of FIG. 25.

In FIG. 26, the microprocessor 60 causes the day of week 52 and time of day 53 to appear on display screen 22. The day of the week 52 is shown as "WED". The time of day is shown as "2:15 AM". The hourglass design 50 does not appear in FIG. 26 because switch 11 is in position adjacent the word "UNRESTRICTED" 12. The "X" design 51 does not appear in FIG. 26 because switch 11 is in the position illustrated in FIG. 4 adjacent the word "UNRESTRICTED".

Figure 27:
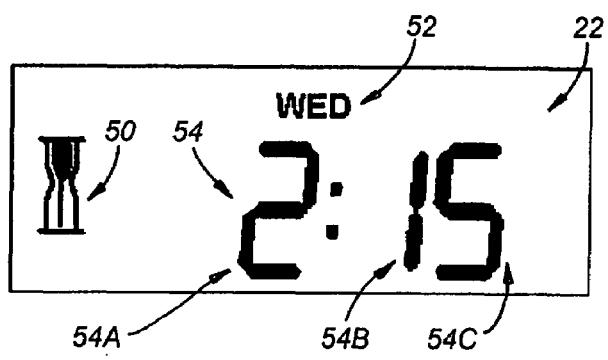
FIG. 27 is a top view illustrating the mode of operation of the display of FIG. 25.

FIG. 27 illustrates screen 22 when the switch 11 is in position adjacent the word "PROGRAM". Microprocessor 60 causes the day of week 52 and the remaining viewing time 54 to be displayed. The day of the week 52 is shown as "WED". The remaining viewing time is two hours and fifteen minutes. The hourglass design 50 appears in FIG. 27 because switch 11 is in position adjacent the word "PROGRAM" 13. The "X" design 51 does not appear on screen 22 in FIG. 27 because there is still viewing time remaining. When switch 11 is in position adjacent the word "PROGRAM" and there is more than ten minutes of viewing time remaining, microprocessor causes a speaker (not visible) in microprocessor 60 to sound an audible alarm at the following intervals. When ten minutes of viewing time is remaining, a one second long beep will sound. When five minutes of viewing time is remaining, four 0.5 second long beeps sound, with 0.5 seconds of time between successive beeps. When one minute of viewing time is remaining, eight 0.5 second long beeps sound, with 0.5 seconds of time between successive beeps. When five seconds of viewing time is remaining, ten beeps each 0.25 seconds long sound, with 0.25 second between successive beeps.

Figure 28:
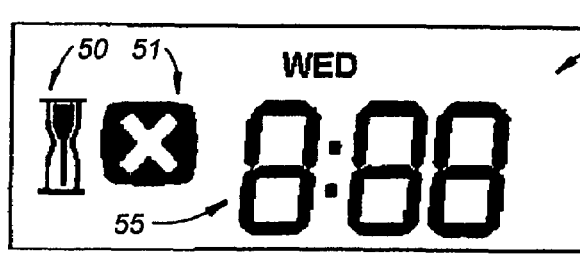
FIG. 28 is a top view illustrating the mode of operation of the display of FIG. 25.

FIG. 28 illustrates screen 22 when the switch 11 is positioned adjacent the word "PROGRAM". Microprocessor 60 causes the day of week 52 and the remaining viewing time 54 to be displayed on screen 22. The day of the week 52 is shown as "WED". Since there is no remaining viewing time, "8:88" 55 is displayed. If desired, microprocessor 60 can be programmed to display "0:00" instead of "8:88". The "8:88" 55 appears on screen 22 for five minutes after the viewing time has completely elapsed. Once this five minute time period has passed, microprocessor 60 causes the time of day 53 to appear on screen 22 in place of "8:88". The time of day 53 appears in the manner shown in FIG. 25. The hourglass design 50 appears on screen 22 in FIG. 27 because switch 11 is in position adjacent the word "PROGRAM" 13. The "X" design 51 appears on screen 22 in FIG. 28 because there is no viewing time remaining.

Figure 29:
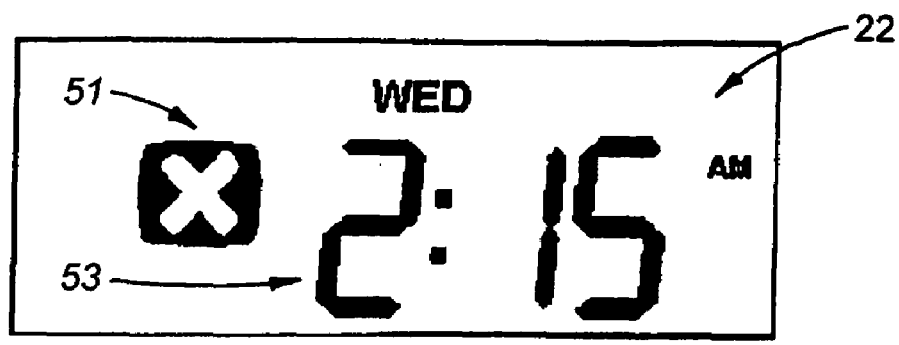
FIG. 29 is a top view illustrating the mode of operation of the display of FIG. 25.

FIG. 29 illustrates screen 22 when the switch 11 is positioned adjacent the word "OFF" 14 (FIG. 4). Microprocessor 60 causes the day of week 52 and the time of day 53 to be displayed. The day of the week 52 is shown as "WED". The time of day is 2:15 AM. The hourglass design 50 does not appear on screen 22 in FIG. 29 because switch 11 is not in position adjacent the word "PROGRAM" 1, but is instead in position adjacent the word "OFF" 14. The "X" design 51 appears on screen 22 in FIG. 27 because there is no viewing time available. When the switch 11 is slid to a position adjacent the word "OFF" 14, microprocessor 60 does not permit electricity to flow through connector 40A to cord 25.

Figure 30:
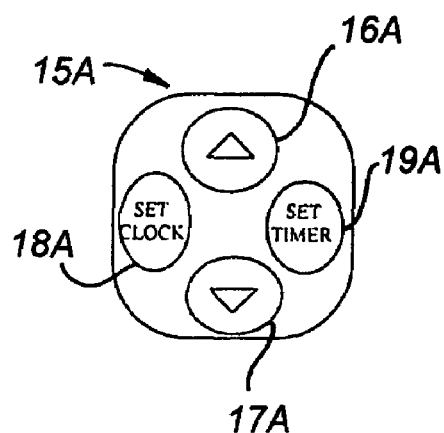
FIG. 30 is a top view illustrating another configuration of a program control button in the electrical monitoring apparatus of FIG. 1.
Figures 31, 32:
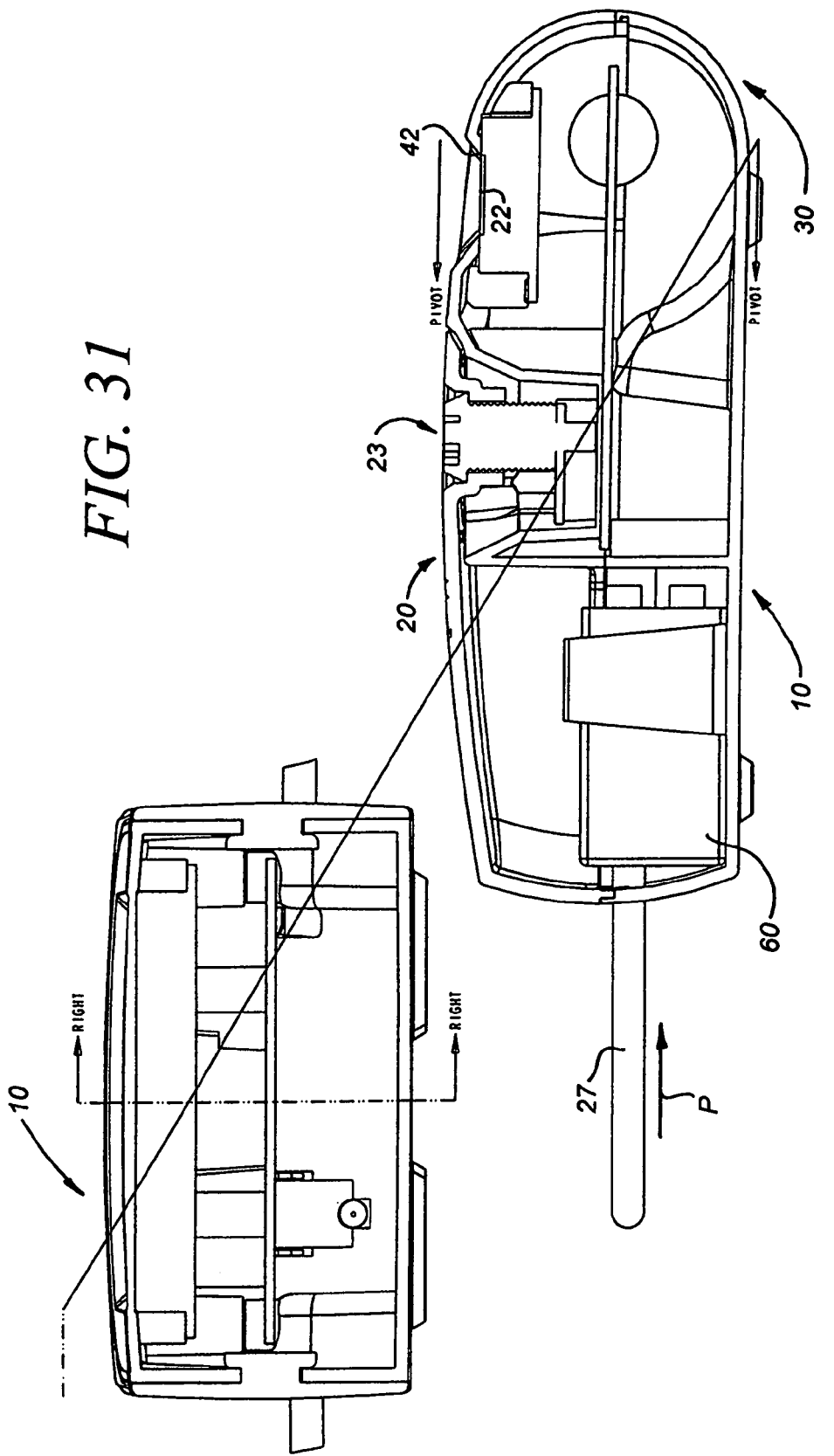
FIG. 31 is an end elevation section view illustrating the apparatus of FIG. 6.
FIG. 32 is a side section view illustrating the apparatus of FIG. 6.

FIG. 30 illustrates an alternate presently preferred configuration 15A of switch 15. Switch 15A in FIG. 30 includes scroll up button 16A, scroll down button 17A, "SET CLOCK" button 18A, and "SET TIMER" button 19A.

In use, lock 23 is, if necessary, unlocked and cover 20 is pivoted to the open position that is illustrated in FIGS. 1 and 2. Plug 25A on a cord 25 from a television or other electrical appliance is inserted in electrical connector 40A in the position illustrated in FIG. 2. The plug on the distal end of cord 27 is inserted in an electrical wall outlet. A parent or other individual who is overseeing the viewing of television or the use of another electrical appliance, insures that switch 11 is in position adjacent "PROGRAM" 13 to enable the clock, timer, and day to be programmed.

The time-of-day is set as follows. Switch 11 is, as noted, in a position adjacent the word "PROGRAM" 13. Button 18A is depressed. The letters "MON" (for Monday) light up on screen 22 and begin flashing. The user can select "MON" by again depressing button 18A, or can depress and release button 16A, to cause "TUE" to appear on screen 22 (or to cause one of the other days of the week to appear by depressing button 16A until the desired day flashes on screen 22, and by then releasing button 16A.) After the user depresses button 18A a second time to select the day (which day is WED in FIG. 25), the left most digit (the hour digit) in the time of day on screen 22 begins flashing on and off. The hour digit can be adjusted up from "2" to 3, 4 etc. (using button 16A) or down from "2" to 1, 0, 9, etc. (using button 17A) to scroll to the desired digit. In FIG. 25, digit "2" was selected. Holding down scroll button 16A or 17A for a sufficiently long period of time will cycle the hour digit forward or backward and move the time from AM to PM or vice-versa. After the desired hour digit is selected by using button 16A or 17A, button 18A is depressed to select that digit. After button 18A is depressed, the second digit 53B in the time of day begins flashing on and off. The digit can be adjusted up from "1" to 2, 3, 4 etc. (button 16A) or down from "1" to 0, 9, 8, etc. (button 17A) to scroll to the desired digit. In FIG. 25, digit "1" was selected. After the desired digit is selected by using button 16A or 17A, button 18A is depressed to select that digit. After button 18A is depressed, the third digit 53C in the time of day begins flashing on and off. The digit can be adjusted up from "5" to 6, 7, 8 etc. (button 16A) or down from "5" to 4, 3, 2, etc. (button 17A) to scroll to the desired digit. In FIG. 25, digit "5" was selected. After the desired digit is selected by using button 16A or 17A, button 18A is depressed to select that digit and to complete setting the time of day.

The timer is set as follows. The timer indicates and determines how long the electrical appliance connected to the distal end of cord 25 can be utilized during a 24 hour period, i.e. how long the appliance can be utilized during a particular day of the week. (The timer can also, if desired, be programmed to indicate how long an electrical appliance or appliances can be utilized during any other desired period of time. For example, instead of programming the timer to reflect how long an electrical appliance can be used during a period of time comprising a day, the timer can be programmed to reflect how long an electrical appliance can be used during a week, or month, or hour, etc.) Switch 11 is, as noted, in position adjacent the word "PROGRAM" 13. Button 19A is depressed. The letters "MON" (for Monday) light up on screen 22 and begin flashing. The user can select "MON" by again depressing button 19A, or can depress button 16A, to cause "TUE" to appear on screen 22 (or to cause one of the other days of the week to appear by depressing button 16A until the desired day flashes on screen 22, and by then releasing button 16A.) After the user depresses button 19A a second time to select the day (which day is WED in FIG. 27), the left most digit 54A (the "hour" digit) in the viewing time displayed on screen 22 begins flashing on and off. The digit can be adjusted up from "2" to 3, 4 etc. (using scroll button 16A) or down from "2" to 1, 0, 9, etc. (using scroll button 17A) to scroll to the desired digit. In FIG. 27, digit "2" was selected. After the desired digit is selected by using buttons 16A, 17A, button 19A is depressed to select that digit. After button 19A is depressed, the second digit 54B in the viewing time begins flashing on and off. The digit can be adjusted up from "1" to 2, 3, 4 etc. (using button 16A) or down from "1" to 0, 9, 8, etc. (using button 17A) to scroll to the desired digit. In FIG. 27, digit "1" was selected. After the desired digit is selected by using button 16A or 17A, button 19A is depressed to select that digit. After button 19A is depressed, the third digit 54C in the viewing time begins flashing on and off. The digit can be adjusted up from "5" to 6, 7, 8 etc. (using button 16A) or down from "5" to 4, 3, 2, etc. (using button 17A) to scroll to the desired digit. In FIG. 27, digit "5" was selected. After the desired digit is selected by using button 16A or 17A, button 19A is depressed to select that digit and to complete setting the time of day. Using the foregoing procedure, microprocessor 60 is programmed to allow two hours and fifteen minutes of viewing on Wednesday. After microprocessor 60 is so programmed, cover 20 ordinarily is closed by the parent or operator or other individual controlling the viewing of television or use of another electrical appliance, and a key is used to operate lock 23 to lock cover 20 in the closed position. The parent or another person of appropriate authority then retains possession of the key.

Microprocessor 60 automatically begins decreasing programmed viewing time when it detects electricity flowing from cable 27, connector 40, and into cable 25. Electricity flows into cable 25 when the electrical appliance connected to the distal end of cable 25 is "turned on" or is operated. If, for example, cable 25 is plugged into a television after microprocessor 60 is programmed to permit two and one-quarter hours of viewing on Wednesday, and a user watches the television for an hour on Wednesday, the microprocessor 60 continuously decreases the viewing time in one minute increments in the memory associated with microprocessor 60 and also causes (when switch 11 is positioned adjacent the word "PROGRAM") the remaining viewing time 54 displayed on screen 22 in FIG. 27 to decrease in one minute increments while the television is being viewed (or to decrease in any other desired length of time increment) until the remaining viewing time 54 displayed on screen 22 is "1:15" (i.e., the remaining viewing time is one hour and fifteen minutes because microprocessor 60 deducts one hour from the original two and one-quarter hour programmed viewing time.). If the television is turned off after one hour, the microprocessor 60 stops deducting in one minute increments of time from the remaining one hour and fifteen minute allotted programmed viewing time and "1:15" continues to be displayed on screen 22 in FIG. 27. Once a user has watched television (or operated another appliance or appliances that requires electricity via cable 25) for the allotted two hour and fifteen minute time period, microprocessor 60 causes (when switch 11 is positioned adjacent the word "PROGRAM") the display shown in FIG. 28 to appear on display screen 22. As noted earlier, the "X" design 51 on screen 22 in FIG. 28 indicates that there is no viewing time remaining. When there is no viewing time remaining, microprocessor 60 issues signals to connector 40A that opens a switch or otherwise prevents electricity from flowing from connector 40A into cable 25. When microprocessor 60 prevents electricity from flowing into cable 25, the electrical appliance connected to the distal end of cable 25 can not be operated. Additional viewing time can be programmed into the timer, but only after the parent unlocks and opens cover 20 and programs the timer in the manner described above. When cover 20 is in the closed position illustrated in FIGS. 5 to 8, plug 25A is secured in and can not be removed from apparatus 10. When cover 20 is in the open position illustrated in FIGS. 1 and 2, plug 25A can be "unplugged" from and removed from apparatus 10. When cover 20 is in the closed position illustrated in FIGS. 5 to 8, switch 11 and switch 15 or switch 15A can not be operated. When cover 20 is in the open position illustrated in FIGS. 1 and 2, switches 11 and 15 or 15A can be manually operated.

As would be appreciated by those of skill in the art, any desired procedure for setting the time-of-day and viewing time can be programmed into microprocessor 60 in conjunction with the operation of buttons 16A to 19A and slide switch 11, or, in conjunction with any other button and/or switch arrangement utilized in apparatus 10.

Having described my invention in such terms as to enable those of skill in the art to make and practice it, and having described the presently preferred embodiments thereof, we claim:

The invention claimed is:

1. A method for controlling the use of an entertainment electrical appliance selected from a group consisting of a television, a computer, and a video game, the electrical appliance including a electric outlet cord to provide electricity to the electrical appliance, the outlet cord including a distal end having a plurality of prongs shaped and dimensioned to be inserted in an electrical outlet, the method including the steps of:

(a) providing a control unit including
  (i) a housing (40),
  (ii) an electrical transfer unit mounted in said housing and including
    a transfer unit outlet shaped to receive said prongs on said outlet cord and to provide electricity to said outlet cord,
    a power cord having a proximate end permanently connected to said housing and having a distal end shaped and dimensioned to be inserted in the electrical outlet,
    a switch (11) to control the flow of electricity to the outlet cord when said prongs are inserted in said transfer unit outlet,
    a microprocessor,
    a control button (15) to program said microprocessor,
  (iii) a display screen (22) mounted in said housing,
  (iii) a base (30) connected to said housing,
  (iv) a unitary cover (20) pivotally connected to said base by a pair of opposing wings (20A) and movable between
    a first open operative position spaced apart from said base (30) to expose and permit access to said switch (11) and said control button (15), and
    a second closed operative position adjacent said base (30) to cover and prevent access to said switch (11) and said control button (15),
    permit viewing of said display screen (22),
    enclose and capture said prongs (25A) of said power cord and said proximate end of said power cord between said cover and said base,
  (v) a lock (23) mounted in said cover (20), including a movable foot (23A), and operable to move said foot;
  (vi) an aperture (24) formed in said housing to receive said foot (23A) when said cover (20) is in said second closed operative position to permit said foot to moved between a locked position and an unlocked position in said aperture;
(b) moving said cover to said first open operative position;
(c) inserting said prongs in said transfer unit outlet;
(d) operating said switch and said control button to control the flow of electricity to the outlet cord;
(e) moving said cover (20) to said second closed operative position adjacent said base (30) to cover said switch and said control button, to leave said screen open for viewing, and to enclose and capture said prongs and said proximate end of said power cord between said cover and said base;
(f) operating said lock to move said foot to a locked position in said aperture; and,
(g) inserting said distal end of said power cord in the electrical outlet.

2. In combination with an electrical appliance including an electrical outlet cord, the outlet cord including a distal end having a prong configuration shaped and dimensioned to be inserted in an electrical wall outlet, the improvements comprising apparatus to monitor use of the electrical applicant, said apparatus including
(a) a housing (40),
(b) an electrical transfer unit mounted in said housing and including
   (i) a transfer unit outlet shaped to receive said prongs on said outlet cord and to provide electricity to said outlet cord,
   (ii) a power cord having a proximate end permanently connected to said housing and having a distal end shaped and dimensioned to be inserted in the electrical outlet,
   (iii) a switch (11) to control the flow of electricity to the outlet cord when said prongs are inserted in said transfer unit outlet,
   (iv) a microprocessor,
   (v) a control button (15) to program said microprocessor,
(c) a display screen (22) mounted in said housing,
(d) a base (30) connected to said housing,
(e) a unitary cover (20) pivotally connected to said base by a pair of opposing wings (20A) and movable between
   (i) a first open operative position spaced apart from said base (30) to expose and permit access to said switch (11) and said control button (15), and
   (ii) a second closed operative position adjacent said base (30) to
      cover and prevent access to said switch (11) and said control button (15),
      permit viewing of said display screen (22),
      enclose and capture said prongs (25A) of said power cord and said proximate end of said power cord between said cover and said base,
(f) a lock (23) mounted in said cover (20), including a movable foot (23A), and operable to move said foot;
(g) an aperture (24) formed in said housing to receive said foot (23A) when said cover (20) is in said second closed operative position to permit said foot to moved between a locked position and an unlocked position in said aperture.

* * * * *